United States Patent [19]

Muir

[11] 4,038,664

[45] July 26, 1977

[54] RECORDING CHART LOCK

[75] Inventor: Andrew Redvers Muir, High Wycombe, England

[73] Assignee: The Perkin-Elmer Corporation, Norwalk, Conn.

[21] Appl. No.: 701,719

[22] Filed: July 1, 1976

[51] Int. Cl.² .................. G01D 9/00; G01D 15/24; B65H 17/26
[52] U.S. Cl. ................... 346/1; 346/33 A; 346/136; 226/49; 226/136
[58] Field of Search .......... 346/1, 33 A, 136; 226/49, 134, 136

[56] References Cited

U.S. PATENT DOCUMENTS

| 2,907,997 | 10/1959 | Corwin et al. | 346/33 A |
| 3,396,403 | 8/1968 | Ford et al. | 346/33 A |
| 3,563,656 | 2/1971 | Helms | 346/136 UX |
| 3,844,461 | 10/1974 | Robison et al. | 346/136 X |
| 3,887,122 | 6/1975 | Sommeria | 226/136 |
| 3,942,893 | 4/1976 | Bala | 226/136 X |
| 3,948,425 | 5/1976 | Way | 346/33 A X |
| 3,976,378 | 8/1976 | Pratt | 346/33 A X |

Primary Examiner—George H. Miller, Jr.
Attorney, Agent, or Firm—S. A. Giarratana; F. L. Masselle; E. T. Grimes

[57] ABSTRACT

In a measuring instrument such as a spectrophotometer which is driven under the control of a dedicated microcomputer and has a provision for wavelength scan, a flow chart lock system is obtained by storing in the random access memory of the microcomputer an indication of the actual chart position between two sprockets on the chart drive. With this information and stored data regarding the position of the scanning apparatus of the instrument, accurate repositioning of the chart to accurately reflect the scanning position even after scale changes or different modes of operation have occurred is accomplished.

12 Claims, 5 Drawing Figures

RECORDING CHART LOCK

BACKGROUND OF THE INVENTION

This invention relates to chart recorders in general and more particularly to an improved chart lock system for an instrument operating under the control of a dedicated microcomputer.

In various types of instruments such as spectrophotometers, a chart is driven in synchronism with a scanning device such as a grating which scans through a range of wavelengths whilst analyzing a sample. Charts used with such chart recorders typically have marked thereon the associated wave number scales or other appropriate calibration. The response of the object under test is plotted as the ordinate value and the change of the scan position plotted on the abscissa. The abscissa markings thus must be synchronized with the drive of the scanning device. This becomes a particular problem where there is a change from the normal scan scaling, i.e., where operation is carried out on an expanded scale for example, or where a time drive is used to scan a particular wave number, for example, over a period of time. After changing modes, to go back to the normal scan, there is a need to accurately reposition the chart to the proper wave number. Without some type of chart lock, this might require tedious adjustment by the operator and accuracy would then only be determined by his care and ability. The same problem exists when initially setting up the apparatus. Without a chart lock system, the accuracy from the beginning would be determined only by the operator's ability to position the chart.

Previously, instruments of this nature were driven by electromechanical means. The need for a chart lock was recognized and a solution to that problem is disclosed in U.S. Pat. No. 3,396,403 granted to M. A. Ford et al on Aug. 6, 1968. The device disclosed therein uses a mechanical arrangement wherein a spring loaded pin engages an opening in a drive wheel for the chart recorder to insure perfect alignment of a sprocket location, corresponding to a grid line, and the drive. Although this works well in the prior art systems, newer systems utilize microcomputers which have more recently become available. Although the prior art system could be used therein, such use does not fully take advantage of the microcomputer's capabilities.

Thus, it becomes evident that there is a need for a new and improved chart lock system which can be operated in conjunction with an instrument controlled by a dedicated microcomputer which will result in accurate chart positioning and which is easy to operate.

SUMMARY OF THE INVENTION

The present invention provides such a chart lock system. Although it can be used with essentially any instrument wherein there is a correlation between two drives, e.g., a scanner drive and a chart drive, the chart lock system of the present invention is disclosed in conjunction with an infrared spectrophotometer.

In the infra-red spectrophotometer, the scanning grating which changes the wave number to permit analysis of the substance under test is driven by a stepper motor through the various wave numbers. The chart recorder is driven in sealed synchronism therewith using another stepper motor. As is typical, the chart paper contains holes along its edges which are engaged by sprockets on the chart paper drive spindle. The sprocket holes are aligned with grid lines printed on the chart. The problems to be solved by the present invention are to initialize the chart properly so that when the scanning apparatus is initialized, typically at a wave number of 4,000 $cm^{-1}$, the chart will also be properly initialized so that a grid line lies directly under the recording pen of the recorder. Furthermore, it is a necessity that the operator be able to position a specific grid line thereunder particularly where the grid lines are prenumbered. A second necessity is that, when using such numbered grid paper in particular, and where an expanded mode is entered, the capability be present to reposition the chart exactly to the proper wave number position appropriate to that extension.

Basically, the present invention solves this problem by storing in the random access memory of the microcomputer a record of the actual chart position between two sprockets. From the selected abscissa expansion factor and wave number being scanned, which is controlled by and recorded within the microcomputer, it can also compute the required position. When in a normal scan mode, these two positions will change together. However, if the abscissa expansion factor is changed or if the instrument is placed in a time drive mode, there will no longer be agreement. However, once the normal mode is re-entered, the microcomputer carries out the necessary comparison and repositions the chart to the proper relative position. Associated with the instrument is a control handle which permits repositioning the chart. In this mode, the chart is driven quickly forward or backward by microcomputer control as long as the operator holds his finger on the switch. Once the switch is released, the microcomputer takes over and positions the chart to the proper relative position between the two sprockets where the operator has stopped. For example, if the operator switched to an expanded scale at, for example, a wave number of 2500 $cm^{-1}$ and continued in that mode until he reached the wave number 1998, the pen would have moved far below the 2,000 $cm^{-1}$ mark on the normal chart. Now, desiring to go back into the normal unexpanded mode, the operator wants to position the chart to the 1998 $cm^{-1}$ position. To do this, he would operate his chart drive switch driving the chart backward until he saw the pen was approximately over the 2,000 $cm^{-1}$ mark. He would then release the switch and the system would automatically move the chart to the position corresponding to 1998 $cm^{-1}$.

The instrument also has other features permitting slewing both the scanning apparatus of the spectrophotometer and the chart in synchronism and permitting operating on various scale papers, all of which is done by proper scaling within the microcomputer.

DETAILED DESCRIPTION OF THE PREFERRED EMBODIMENT

Figure 1:
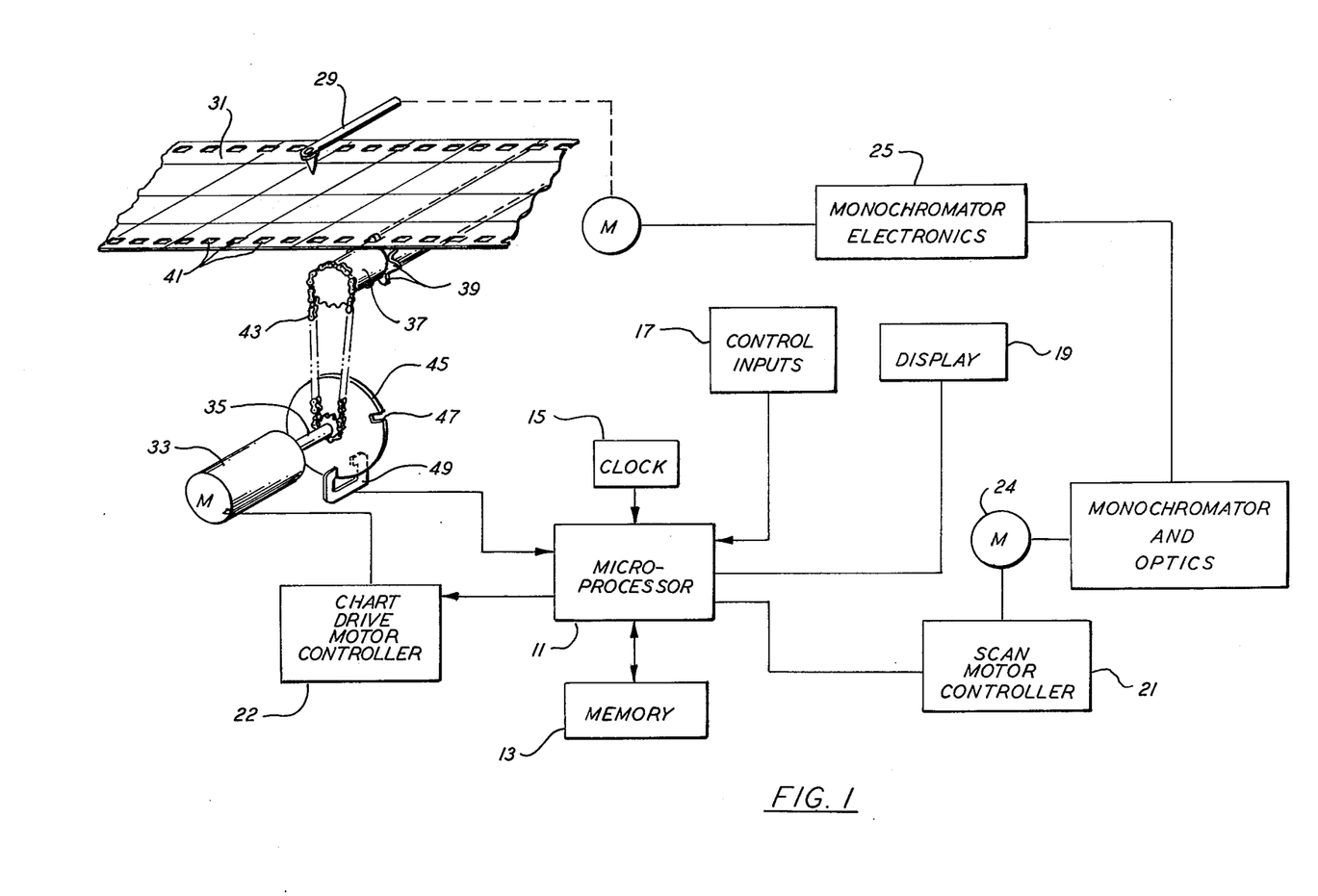
FIG. 1 is an overall block diagram of the system of the present invention.

Although it will be recognized by those skilled in the art that the chart drive of the present invention can be used in any type of instrument, the description of the present drive will be made in conjunction with an infrared spectrophotometer. FIG. 1 illustrates the instrument in basic block diagram form. In the spectrophotometer, it is necessary that the chart and a scanning mechanism which drives a grating to vary the wave number be driven in synchronism. The heart of the present system is a microcomputer including a microprocessor 11 with an associated memory 13 and input-/output facilities. As will be more fully described, the memory includes both read only (ROM) and random access (RAM) portions. The microcomputer receives clock inputs from a clock 15, and control inputs from the control panel 17 of the instrument, as well as other inputs. Outputs from the microcomputer include a display 19 and signals to the scan motor controller 21 and the chart motor controller 22. Scan motor controller 21 drives a first stepper motor 24 which steps the grating of a monochromator 23 to obtain the necessary wave number scanning. Outputs developed in the monochromator are fed to conventional monochromator electronics where they are processed and an output used to drive a pen servo motor 27 which drives a pen 29 in contact with a chart 31. The portion of the system dealing with the monochromator and the development of outputs of the various wave numbers due to scanning will not be described in further detail herein other than is necessary in conjunction with an explanation of the manner in which the chart drive and chart lock of the present system operate. The output of the chart drive motor controller is fed to the chart drive motor 33 which has an output shaft 35 coupled to a drive spindle 37 having sprockets 39 which engage appropriate holes 41 in the chart 31 to drive the chart forward and backward. The connection between the spindle 37 and the shaft 35 is effected by means of a toothed belt 43 or the like. Also on the end of the shaft of the chart drive motor 33 is a disc 45 having a slit 47 therein. Disposed at a predetermined location is an optical sensing mechanism, i.e., means such as a light emitting diode, providing a light output to a photosensor device which is used to sense the position of the slit and provide an appropriate indication to the microcomputer system in a manner to be explained more fully below.

As noted above, the usually employed chart paper 31 is calibrated for a normal spectral scan. In order for the curve traced on the chart by the pen 29 to have meaning, that is, so that the user can correlate wave numbers and amplitude, it is necessary that when the instrument is started off that the pen be aligned above the proper grid line. Furthermore, since it is possible to operate in an expanded scale or to operate in a time scan mode, it is also necessary that when changing the scale expansion, it be possible for the operator to accurately reposition his pen at the proper chart position corresponding to the wave number then being scanned. Thus, the system of the present invention is required to properly initialize the chart, reposition the chart after a change in mode operation has taken place and furthermore to maintain the chart properly synchronized with the monochromator drive when in a scanning mode so that the printed grid lines accurately reflect the monochromator wave number.

Figure 2:
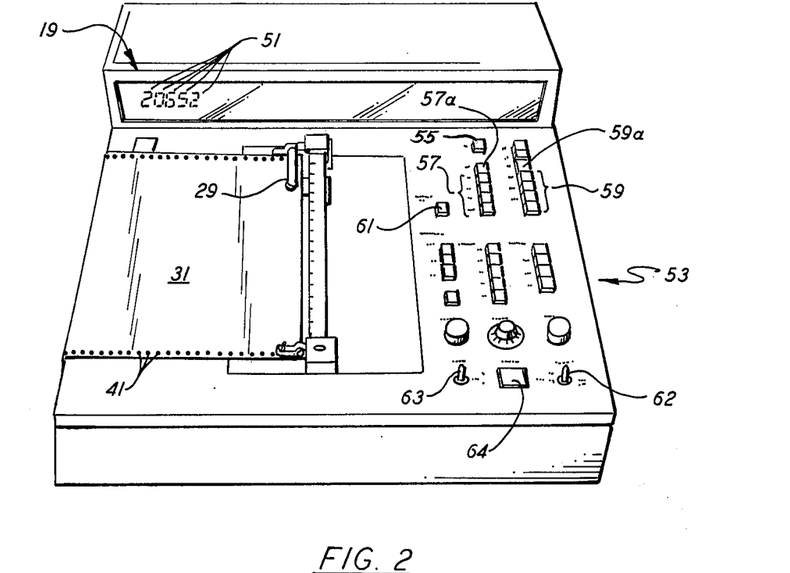
FIG. 2 is a perspective view of an instrument utilizing the chart lock of the present invention.

FIG. 2 is a perspective view of the instrument of the present invention. Once again, the chart paper 31 with its perforations 41 engaged by the sprocket drive is shown as is the pen 29. A number of indications are given on the display panel 19 of the instrument, the most significant of which is the wave number indicated by the five digits 51.

To the right-hand side of the instrument is the control panel. The section designated generally as 53 contains controls for controlling the ordinate such as the mode, expansion and response. This controls the pen drive. Since this is not of particular interest in the present invention, these controls will not be described in detail. The controls in the upper portion of the panel are, however, of importance to the present invention since they deal with the abscissa drive or in other words, the chart drive. Shown is a button 55 labeled "Time Drive" which is used for maintaining a given wavelength over a period of time. In such a case, the wave number remains fixed and the output on the chart represents changes with respect to time. Directly below this are the expansion control buttons 57. Button 57a is the normal position and gives unity expansion in which case the wave numbers printed on the normal calibrated chart paper 31 correspond to the actual wave numbers. Pressing the other buttons 57 permits obtaining two, five, ten and twenty times expansion, depending on which button is pressed.

To the right are a set of buttons 59 controlling the time of scanning. Buttons 59 include a button 59a representing a ten minute scan. Faster and slower scans are also available as indicated on the panel. When in time drive, the inputs from the expansion scale selection buttons determine the rate of the chart speed. For example, the button for a 5X expansion will result in a time drive rate of 5 centimeters per minute. Also in this section of the panel is the 4,000 $cm^{-1}$ wave number index button 61. This is the reset or starting position from which the wave number is scanned downward. Pressing this button causes the instrument's monochromator to reset to 4,000 $cm^{-1}$.

Also of particular interest are the three controls at the bottom of the control panel. These include, on the right-hand side, a slew control 62 which when moved up and down carries out fast slewing backward or forward. Slewing controls both the monochromator grating and the chart, i.e., both are driven in synchronism. On the left-hand side, is an index control 63 which, when moved right and left, is used to index the chart. The manner in which this is used will be explained in more detail below. Finally, there is the scan push-button 64 which, after everything is properly set up, is used to initiate the spectral scan.

Figure 3:
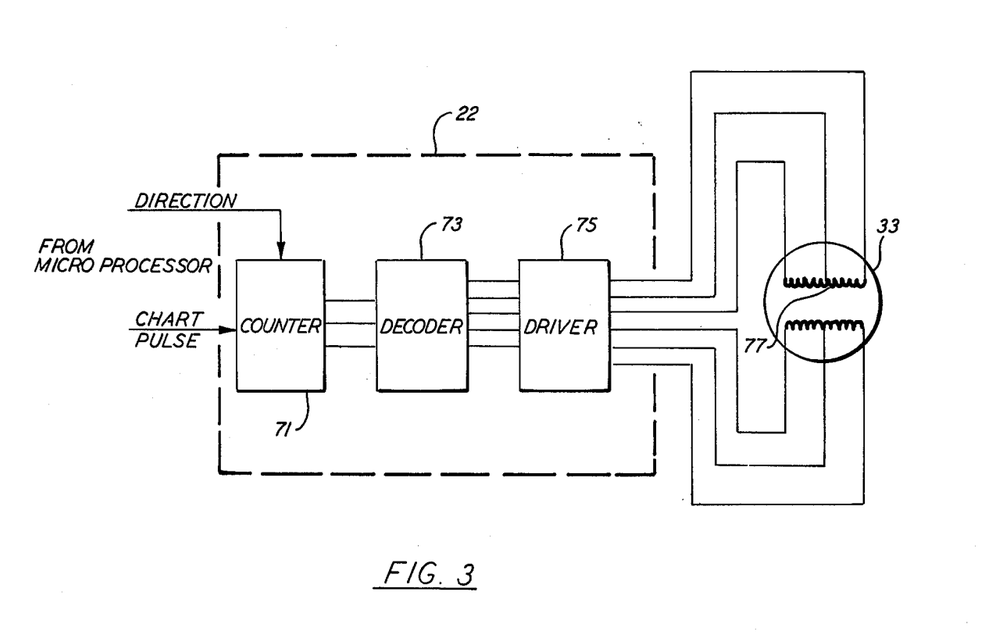
FIG. 3 is a block diagram of the chart drive system of the present invention.

FIG. 3 illustrates in greater detail the arrangement of chart driven motor 33 and its controller 22. As indicated above, the motor 33 is a stepper motor and, as such, has a plurality of windings which are selectively energized to step the motor through its various positions. Because of the gearing ratios between the motor and the chart drive, the steps made by the motor are not apparent on the chart but instead appear as smooth travel, i.e., 400 incremental steps of the motor represent the distance between two sprocket holes. Basic synchronism of the system is, of course, derived from clock 15 of FIG. 1. As will be more fully described presently with reference to the flow charts of FIG. 4, clock pulses are processed in the microcomputer and used to develop chart pulses which bear a direct relationship to the corresponding pulses provided to the scan motor controller 21 of FIG. 1. Also, in accordance with the switch positions such as the position of slew control 62 and the index control 63 of FIG. 2, the microcomputer provides as an output a direction signal. These two signals are the inputs to the chart drive motor controller 22. As shown on FIG. 3, within the chart drive motor controller 22, there is a counter 71 which receives the chart pulses from the microcomputer along with a direction indication, i.e., this is an up/down type counter. The output of the counter is provided to a decoder 73 which converts these outputs into an output command suitable for a driver 75 which then selectively energizes the windings 77 of the stepper motor 33. During operation, the microcomputer 11 stores in its memory 13 an indication of the relative chart position between two grid lines. However, in order that the chart be properly initialized on startup, the optical sensor 49 is required. When the instrument is started, it is initialized to the 4,000 cm$^{-1}$ wave number condition. (This also occurs when the index button is pushed.) Upon initialization, the microcomputer drives the chart motor until it receives an indication from the optical sensor 49 indicating that the slit 47 is aligned therewith whereupon, the storage location within the memory is initialized to zero. At this point, the chart motor drive is aligned so that a grid line will be directly under the pen; however, the operator must ensure that the correct grid line is under the pen. This he does by properly inserting the paper on the teeth 39 of FIG. 1. If the correct grid line is not under the pen, assuming using grid paper which is printed with wave numbers, he can then operate the index control 63 of FIG. 2 to obtain that line. When operating and moving the chart up or down, the chart will in this situation always stop on a grid line as will be explained in detail below with respect to the flow diagram.

Once initialization is accomplished (and, of course, there is a great deal of initialization associated with the remainder of the instrument, which is not of concern herein) operation may begin.

The slit 47 and optical device 49 of FIG. 1 also act to make sure that the device stays in synchronism. In the random access memory 13 of the microcomputer is a counter which keeps track of the position between two sprocket holes. In the present embodiment, 400 chart drive pulses represent travel between two sprocket holes. Also, after each 400 steps in one direction, the slit 47 is again in position. Assuming for the moment that chart lock takes place either at initialization or after changing mode, reference may be had to FIG. 4a which is a basic flow diagram showing the manner in which the chart is driven.

Figure 4A:
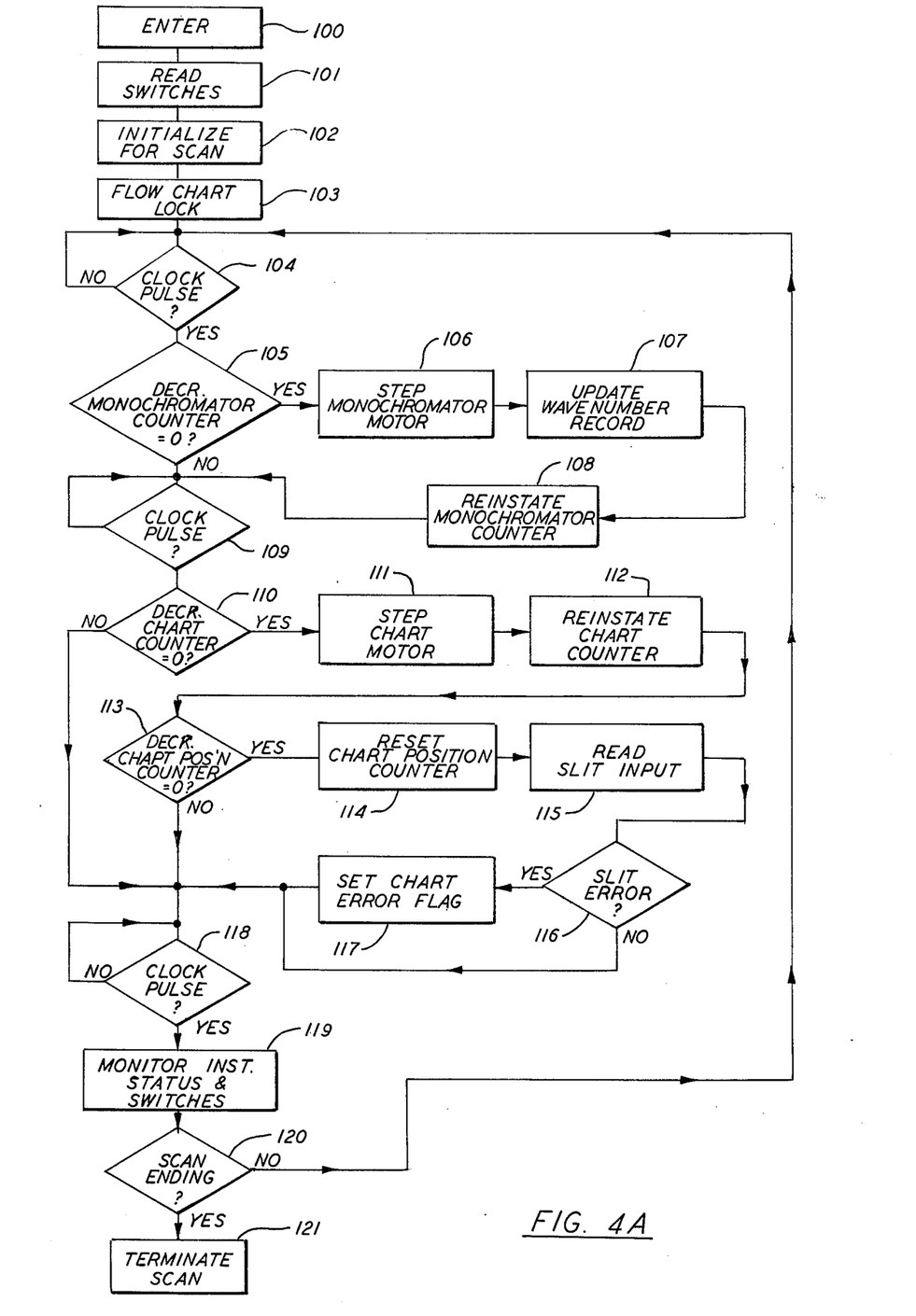
FIGS. 4A and 4B are a flow diagram of the chart drive and chart lock system of the present system.

Referring to FIG. 4a, the microcomputer enters this section of the program at block 100 after the operator signifies by depressing the scan switch that it is desired to enter the SCAN mode. The microcomputer enters block 101 to read various other instrument switches as set by the operator, to determine the required scan rate, abscissa expansion factor, type of chart paper in use, etc. Then in block 102 various parameters to be used during actual SCAN are initialized to values depending on the instrument status and switch settings as read. Then in block 103, the microcomputer executes the program section which performs the flow chart lock function. This section (more detailed in FIG. 4B) adjusts the chart position to line up the printed calibrated grid to that position appropriate to the current wave number setting of the monochromator, the abscissa expansion factor, and the format of chart paper in use. Then from block 104 onwards, the microcomputer enters a software loop which is executed repetitively until SCAN is terminated. This SCAN loop controls operation of the monochromator stepper motor and the stepper motor, and generally monitors the instrument status and switches and performs houskeeping calculations, etc. For convenience (although not necessarily), the SCAN loop may be separated into three parts or phases, each of which is synchronized with the generation of a pulse from the clock oscillator 15.

In block 104, the first SCAN loop phase commences with a wait for the arrival of a clock pulse: block 104 is executed repetitively until a clock pulse is observed as an input to the microcomputer. When the clock pulse does occur, then in block 105, the monochromator counter is decremented and tested for zero. This counter is a software counter in the microcomputer's random access memory which expresses the number of times the SCAN loop must be executed for each step to the monochromator grating motor (24), and thereby the number of clock pulses which must occur per monochromator step. It is thus a software implemented division factor between the clock rate and the monochromator stepper rate, and was calculated and preloaded in block 102 as a function of the selected SCAN rate. If the monochromator counter reaches zero when decremented in block 105, then execution passes to block 106, where the stepper motor driving the monochromator is then moved by one step. In block 107, the microcomputer updates the record in the random access memory of the current monochromator position, to take account of the stepped change just implemented. The new value for the current wave number setting of the instrument is also output to the digital display 51 at this point. In block 108, the full value of the monochromator counter (as previously calculated in block 102) is reinstated. This terminates the first phase of the SCAN loop which has been concerned with stepping the monochromator.

Blocks 109 through 117 constitute the second phase of the SCAN loop. Block 109 is another clock pause, awaiting the arrival of a clock pulse identically to block 104. After the clock pulse is observed, execution passes to block 110 where a chart counter is decremented and tested for zero. This is similar to the monochromator counter decremented in block 105 and is a software counter stored in the microcomputer's random access memory, which in this case contains the number of times the SCAN loop is executed for each chart stepper motor movement (and thus controls the division factor between the clock rate and the chart stepper rate), the initial value having been calculated and preloaded in block 102.

If the chart counter reaches zero when decremented in block 110, execution passes to block 111 where the chart motor is moved by one step. The full value of the chart counter, as calculated in block 102, is then reinstated. Then, execution passes to block 113 where action occurs with the chart position counter. This is the software counter in the random access memory which the microcomputer uses to keep the record of the instantaneous position of the chart drive spindle 37. Every time the chart motor is stepped (block 111), the chart position counter is decremented and tested for zero in block 113. Whenever this counter reaches zero, this indicates that the chart should be positioned exactly at a grid line, and that the slit (47) in the disc (45) should be positioned exactly in the detection device (49). Thus, when the chart position counter reaches zero, the position of the slit is interrogated by the microcomputer reading that function as an input from the detection device (49) in block 115. The condition of this input can then be inspected in block 116 to determine whether the slit is correctly positioned, and if not, a software error indication (flag) can be set by the microcomputer and an external error lamp could be lit if required as in block 117. At this point, all execution paths converge at the end of phase 2 of the SCAN loop which has been concerned with driving the chart motor, maintaining in the chart position counter in the random access memory a record of the current position of the chart spindle, and looking for the calibration slit (47) when it should be positioned in the detection device (49) and recognizing and storing an error condition if not.

SCAN loop phase 3 commences with block 118 which is another pause awaiting a clock pulse, identical to blocks 104 and 109. When the pulse occurs, block 119 is entered to inspect the status of the instrument and read the switches and controls. A test is made in block 120 to determine whether the SCAN may continue, or whether it should be interrupted because the instrument's mode of operation requires a change at this point or because of operator action. If the instrument scan may continue, execution passes to block 104 where the SCAN loop is recommenced. Otherwise, in block 121, the microcomputer terminates the scanning mode of the instrument.

Although the SCAN loop as outlined above has been described as being of three phases, each individually synchronized to a clock pulse, this is not necessary to the flow chart lock scheme which could be implemented in a differently detailed manner. The essential points being described are that flow chart locking occurs at the beginning of the scan, and that during scan, every time the chart motor is stepped, the chart position counter is updated and whenever the value therein indicates that the slit (47) should be positioned within its detector (49), this is tested for and an error indication stored if the test fails.

The instrument may also be slewed or indexed by operator control, which are modes by which the microcomputer is caused to rapidly move the chart from one position to another, with the monochromator respectively either moving also (to track the movement of the chart), or the monochromator remaining still as the chart moves. In these modes of operation, the manner in which the microcomputer controls the instrument is broadly similar to that depicted in 4A and described above. In the index mode, the section implementing monochromator movement is bypassed, as the chart alone is to be moved. Also, the flow chart locking does not occur at the commencement. However, the control of the chart, the operation of the chart position counter to maintain a record of the current chart spindle position, and the inspection of the disc slit position to verify that the chart is positioned over a grid line when the chart position counter so indicates, occurs in the same manner as when the instrument is scanning.

Flow chart lock will also occur when the instrument is idle and microcomputer is awaiting operator instructions from switch settings. In this case, the microcomputer will under appropriate conditions perform the flow chart lock function if the operator changes some setting which makes repositioning the chart appropriate (i.e., selecting an abscissa scale change which requires the chart to be positionally altered for differently calibrated paper).

Figure 4B:
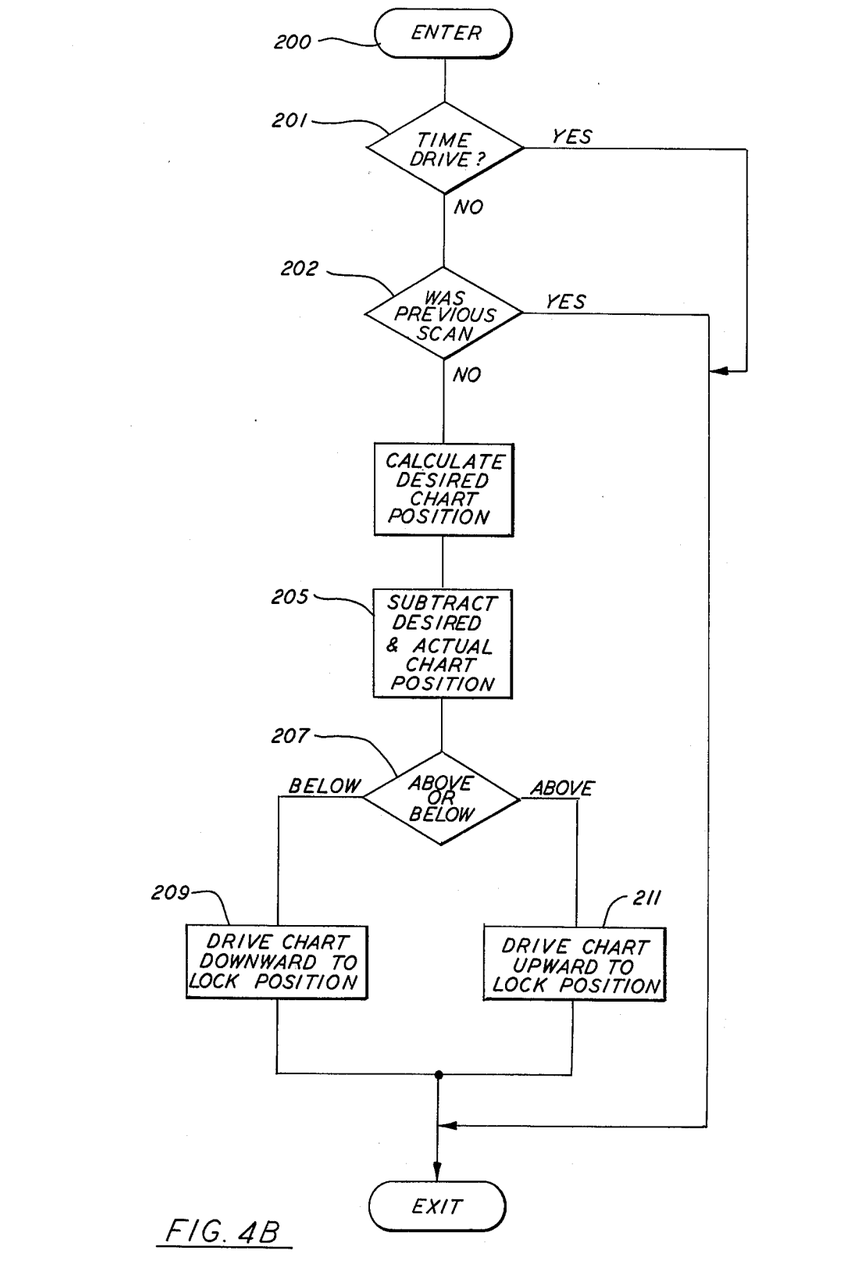

The chart lock subroutine itself is illustrated on FIG. 4B. In the first decision block 201, after entering through block 200, a check is made to see whether or not the system is in time drive. If it is, chart lock is not performed and the subroutine is immediately exited. Next, a check is made to see if the system was previously in scan in decision block 202. If the system had been scanning, it is already locked and nothing further need be done and, once again, this subroutine is exited. If the system was not previously in scan, the desired chart position is then calculated. Within the microcomputer, there is stored at all times an indication of the wave number. The relationship between wave number and chart position depends on the abscissa expansion factor. Thus, the program carries out the necessary mathematical operations to determine where, between two sprocket positions, the chart should be. Once this is done, the actual position and this desired chart position, the actual chart position having been stored in the random access memory in the manner described above, are compared as indicated by block 205. The difference is inspected to determine the direction of minimum travel to cause it to disappear. If it is below, block 209 is entered and the chart is driven downward until the desired and actual positions are equal whereupon the chart is locked in that position. Similarly, if it is above, the block 211 is entered and the chart is driven upward to the desired lock position. In each case, this results in the chart being driven to the closest proper position with respect to a pair of sprocket holes. In actual operation, as noted above, the operator after having been in a mode where the numbers on the chart did not accurately reflect the wave numbers, e.g., time drive, wishing to go back to the normal times 1 scan, operates the control 63 to move the pen to the approximate chart position. Upon releasing this switch, the system automatically performs the chart lock of FIG. 4B to drive the chart to the proper position. A problem may exist if the operator does not get the chart close enough, in which case, the automatic mechanism described by FIG. 4B will drive the chart to lock at an incorrect position on the calibrated paper.

This will readily be apparent to the operator since he will be off by several sprocket intervals and he need only move his control 63 again to bring the chart sufficiently close to the desired position whereupon exact locking will take place.

With reference to FIG. 4A, it becomes apparent that the blocks 105 and 110 in which a division is done permit driving the chart at various different scales and also will permit locking it to different scales. Thus, where a small, e.g., notebook size paper (with reduced abscissa scale) is to be used, it is only necessary that the calculation be done differently in order that a different scale be represented by chart travel.

What is claimed is:

1. In an analytical instrument in which a sample under test is analyzed over a continuous range of at least one input variable, with the response of said sample plotted as the ordinate value and the change of variable as the abscissa value on an associated chart recorded having a sprocket drive, said instrument having associated therewith a microcomputer including a microprocessor, a read only memory, a random access memory, and input/output facilities, the microcomputer at all times having stored therein the instantaneous value of the independent variable, the chart paper having graduated grid lines thereon corresponding to various independent variable values, a method of synchronizing said instrument and said chart recorded to obtain correspondence between said independent variable and said chart lines comprising:
  a. maintaining in the random access memory of the microcomputer a record of the instantaneous position of the chart drive, representing the current position of the drive sprockets;
  b. positioning the chart paper on which recording is to be carried out on at a position approximating the grid position corresponding to the independent variable value;
  c. calculating from the independent variable value a desired chart position;
  d. differencing the desired chart position and actual chart position; and
  e. moving said chart until said difference is zero.

2. The method according to claim 1 wherein said step of maintaining the record of actual position comprises maintaining a count in a counter in said microcomputer and wherein said step of checking is carried when said counter is at zero.

3. The method according to claim 1 and further including the step of initializing said chart drive when starting said instrument, said instrument having been also initialized to a perdetermined independent variable value comprising the steps of placing means on said chart drive to provide an output when a sprocket is properly aligned; driving said chart drive until said predetermined position is reached; and placing the chart paper on said sprocket such that the line corresponding to the initial position of the independent variable is aligned; and zeroing said counter wherein the actual position of said chart drive is stored.

4. The method according to claim 1 wherein said step of differencing is carried out so as to determine the minimum absolute difference between the desired chart position and actual chart position whereby the chart will be moved in one direction or the other, the direction in which it is moved being the direction which will result in a difference of zero after the shortest possible movement thereby causing the chart to move to the nearest proper relative position.

5. The method of claim 1 and further including driving said chart after synchronization by steps comprising:
  a. moving said chart in increments as said independent variable is changed while simultaneously updating the recorded virtual position as stored in said random access memory.

6. The method according to claim 5 and further including the step of indepentently checking the position of the chart drive each time the actual position indicates having traveled the distance between two sprockets.

7. In a measuring instrument in which an object under test is measured over a continuous range of at least one input variable, with the response of said object plotted as the ordinate value and the change of variable as the abscissa value on an associated chart recorder having a sprocket drive, said instrument having associated therewith a microcomputer including a microprocessor, a read only memory, a random access memory, and input/output facilities, the microcomputer at all times having therein the value of the independent variable, the chart paper having lines thereon corresponding to various independent variable values, said chart recorder sprocket drive including:
  a. a stepper motor;
  b. a sprocket spindle mechanically coupled to said stepper motor;
  c. a controller for said stepper motor;
  d. a clock having its output coupled to the microcomputer, the microcomputer processing said clock inputs to provide pulses to said chart drive stepper motor at a predetermined rate, apparatus for synchronizing said instrument and said chart recorder to obtain correspondence between said independent variable and the lines on said chart comprising:
  e. a counter in the random access memory of the microcomputer being arranged to have a count capacity corresponding to the distance between a predetermined number of sprockets on said sprocket drive, said counter being updated in synchronism with the same pulses and direction signal provided to said stepper motor whereby said counter will maintain a count corresponding to the relative position of said chart drive over the distance between said predetermined number of sprockets;
  f. means for initializing said chart drive and said counter;
  g. means optionally selectable by an operator for causing pulses to be output by said microcomputer to slew said chart drive to permit positioning the chart paper to an approximately correct position corresponding to said independent variable; and
  h. said microcomputer arranged to
    1. calculate from the independent variable value a desired chart position;
    2. difference the desired chart position and actual chart position; and
    3. couple pulses and direction signal to said motor controller to drive said chart until the difference between the desired chart position and actual chart position is zero.

8. Apparatus according to claim 7 wherein said predetermined number of sprockets is two.

9. Apparatus according to claim 7 wherein said instrument is a spectrophotometer.

10. Apparatus according to claim 7 wherein said means for initializing comprise:
  a. means for detecting a predetermined angular position on the shaft of said stepper motor corresponding to the alignment of a grid line on said chart paper, the output of said means being coupled as an input to said microcomputer; and
  b. wherein said microcomputer is adapted to reset said counter to zero upon detection of said input.

11. Apparatus according to claim 10 wherein after synchronization, said microcomputer is adapted to move said chart in increments as said independent variable is changed while simultaneously updating the actual position in said counter and wherein said microcomputer is further adapted to make a comparison each time the count in said counter is zero to see that the output of said means for detecting is present and to provide an error indication if correspondence between a zero count and the presence of said output do not occur simultaneously.

12. Apparatus according to claim 10 wherein said means for detecting said shaft position comprise a disc coupled to said shaft having a slit therein; means on one side of said disc for providing a light output; and photodetector means on the other side of said disc.

* * * * *

UNITED STATES PATENT AND TRADEMARK OFFICE
CERTIFICATE OF CORRECTION

PATENT NO. : 4,038,664
DATED : July 26, 1977
INVENTOR(S) : Andrew Redvers Muir

It is certified that error appears in the above-identified patent and that said Letters Patent are hereby corrected as shown below:

Column 1, line 62, change "infra-red" to --infrared--.

Column 2, line 16, change "extension" to --expansion--.

Column 6, line 7, change "houskeeping" to --housekeeping--.

Column 9, line 28, change "perdetermined" to --predetermined--;

line 55, change "indepentently" to --independently--.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*